United States Patent [19]
Kushiro et al.

[11] Patent Number: 5,495,406
[45] Date of Patent: Feb. 27, 1996

[54] LOAD CONTROL SYSTEM

[75] Inventors: Noriyuki Kushiro; Kazuyuki Igarashi, both of Kanagawa, Japan

[73] Assignee: Mitsubishi Denki Kabushiki Kaisha, Tokyo, Japan

[21] Appl. No.: 482,841

[22] Filed: Jun. 7, 1995

Related U.S. Application Data

[62] Division of Ser. No. 944,315, Sep. 14, 1992, Pat. No. 5,455,761, which is a continuation of Ser. No. 405,140, Sep. 11, 1989, Pat. No. 5,175,677.

[30] Foreign Application Priority Data

Sep. 14, 1988 [JP] Japan .................................. 63-230295
Apr. 21, 1989 [JP] Japan .................................. 1-102748
Apr. 26, 1989 [JP] Japan .................................. 1-106629

[51] Int. Cl.⁶ .......................... G06F 17/00; H04M 11/04
[52] U.S. Cl. ............... 364/140; 340/310.01; 340/310.06; 340/825.06
[58] Field of Search .................................. 364/140–146, 364/138–139, 492–494; 307/38–42; 340/310.01, 310.06, 310.08, 825.06, 825.07, 825.08

[56] References Cited

U.S. PATENT DOCUMENTS

| | | |
|---|---|---|
| 4,302,750 | 11/1981 | Wadhwani et al. . |
| 4,347,575 | 8/1982 | Gurr et al. . |
| 4,418,333 | 11/1983 | Schwarzbach et al. . |
| 4,419,667 | 12/1983 | Gurr et al. . |
| 4,484,258 | 11/1989 | Miller et al. . |
| 4,656,593 | 4/1987 | Gleba et al. . |
| 4,703,306 | 10/1987 | Barritt . |
| 4,763,104 | 8/1988 | Inoue et al. . |
| 4,783,748 | 11/1988 | Swarztrauber et al. . |
| 4,792,731 | 12/1988 | Pearlman et al. . |
| 4,933,668 | 6/1990 | Oyer et al. . |
| 4,939,728 | 7/1990 | Markkula, Jr. et al. . |
| 5,175,677 | 12/1992 | Kushiro et al. ............... 364/140 |
| 5,196,823 | 3/1993 | Formigoni . |
| 5,327,307 | 6/1994 | Wolf et al. .................. 364/140 |
| 5,416,777 | 5/1995 | Kirkam ................... 340/310.06 |

FOREIGN PATENT DOCUMENTS

| | | |
|---|---|---|
| 0265342 | 4/1988 | European Pat. Off. . |
| 56-7587 | 1/1981 | Japan . |
| 60-114043 | 6/1985 | Japan . |
| 63-64140 | 4/1988 | Japan . |

Primary Examiner—Roy N. Envall, Jr.
Assistant Examiner—Thomas E. Brown
Attorney, Agent, or Firm—Burns, Doane, Swecker & Mathis

[57] ABSTRACT

An improved luminaire load control system for handling control signals as by converting them into power line carrier communication signals which are transmitted through branch power lines to terminal control units without causing any significant interference to power line installation. the conversion of the control signals is done respectively at a plurality of gate way units mounted on each branch power line and each gate way unit further includes memory unit for storing the information regarding to the connecting status of the terminal unit for sending back the stored information to a central control unit upon receipt of a send back command therefrom. In a specific embodiment of the invention, a plurality of gate way units are mutually connected with specific signal transmission lines for providing the reciprocity control of luminaire loads by installing a plurality of operation command input terminals in each of the branch power line, whereby the control signal is transmitted through the specific signal transmission lines.

2 Claims, 12 Drawing Sheets

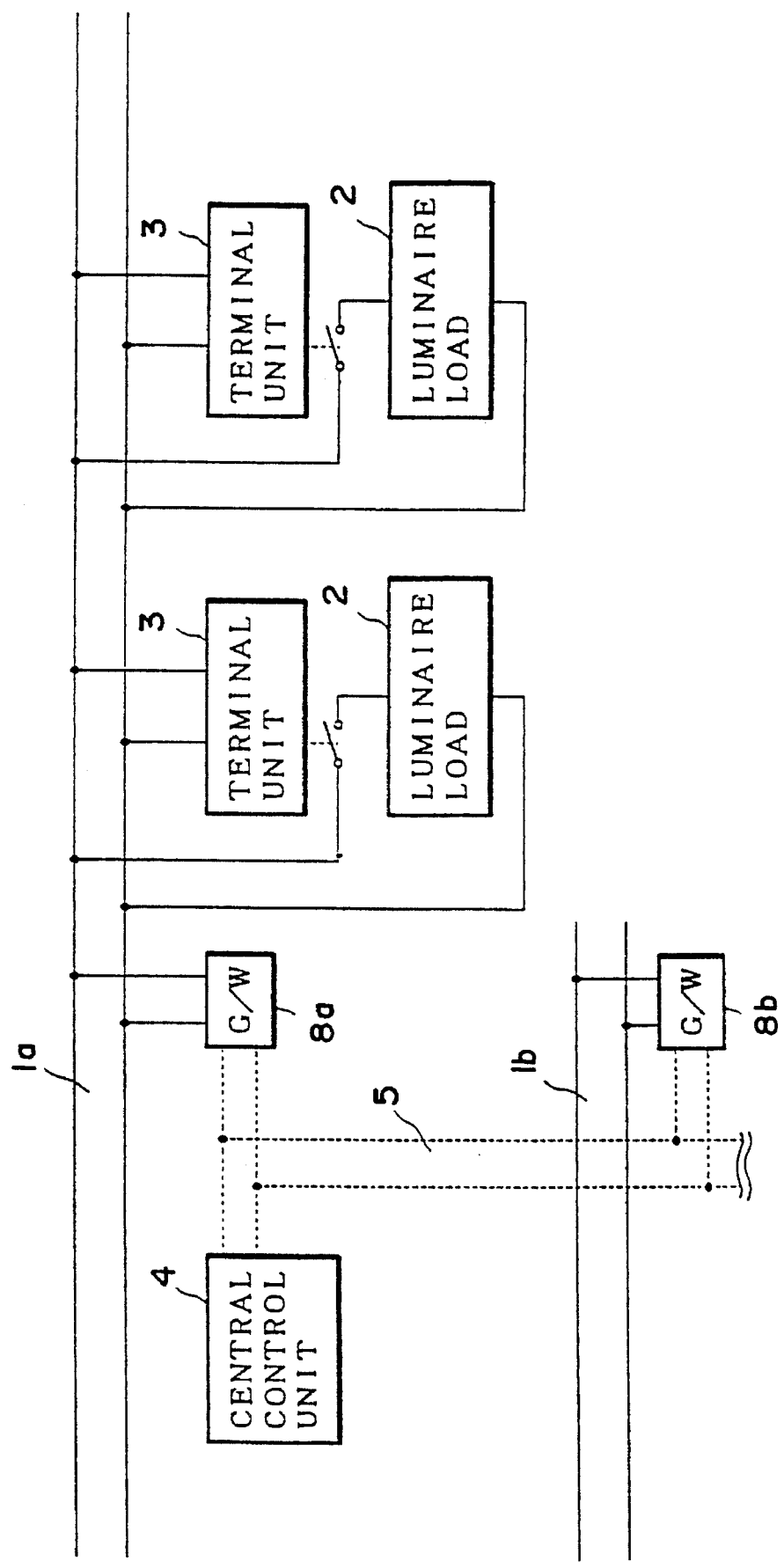

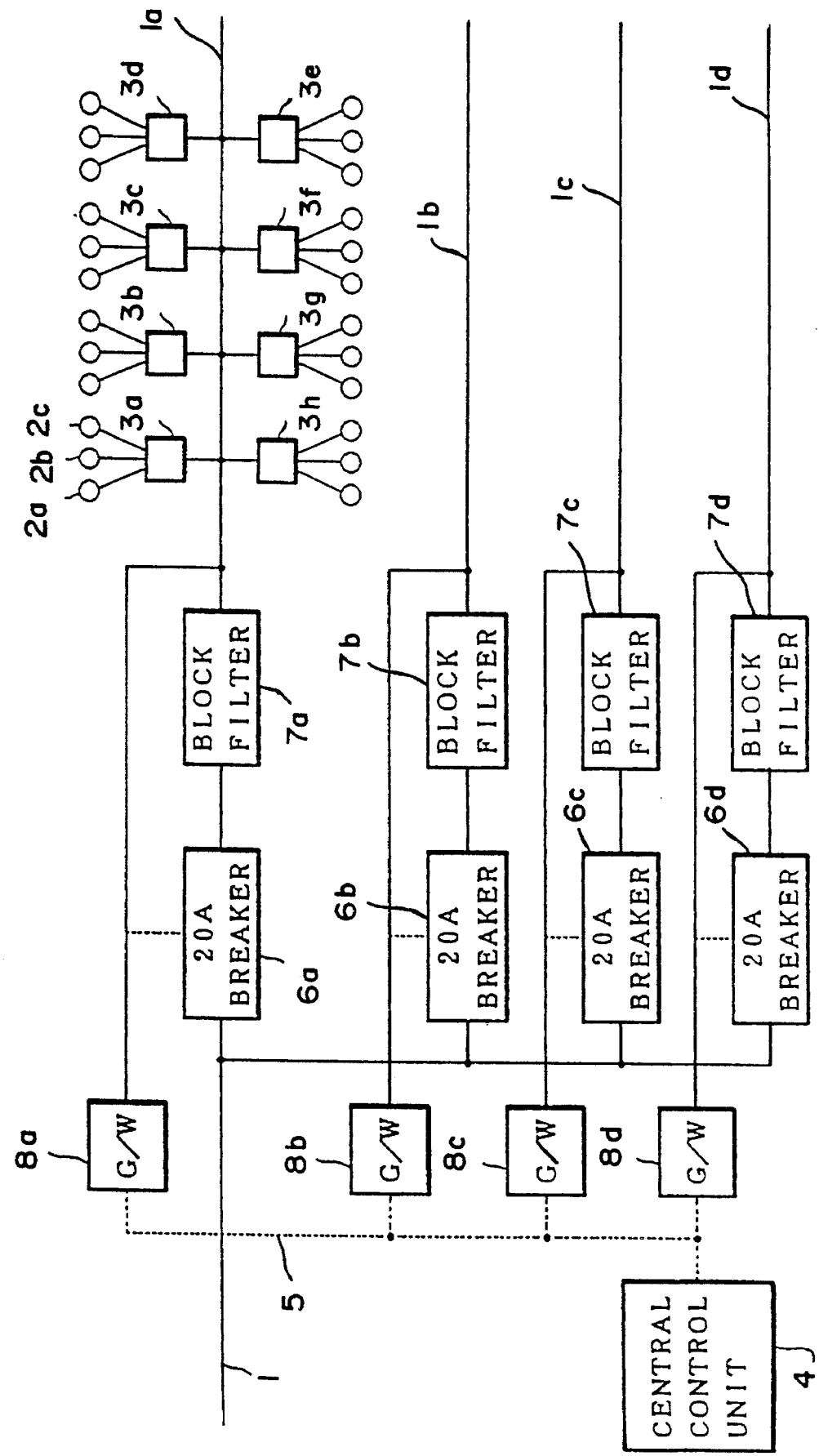

F I G. 7
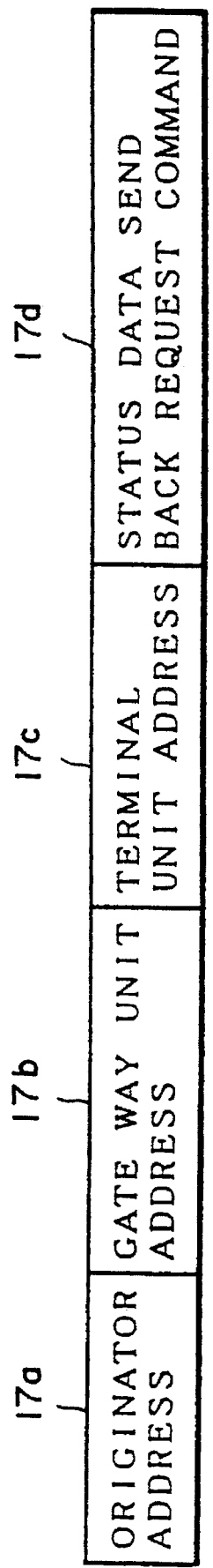

F I G. 11
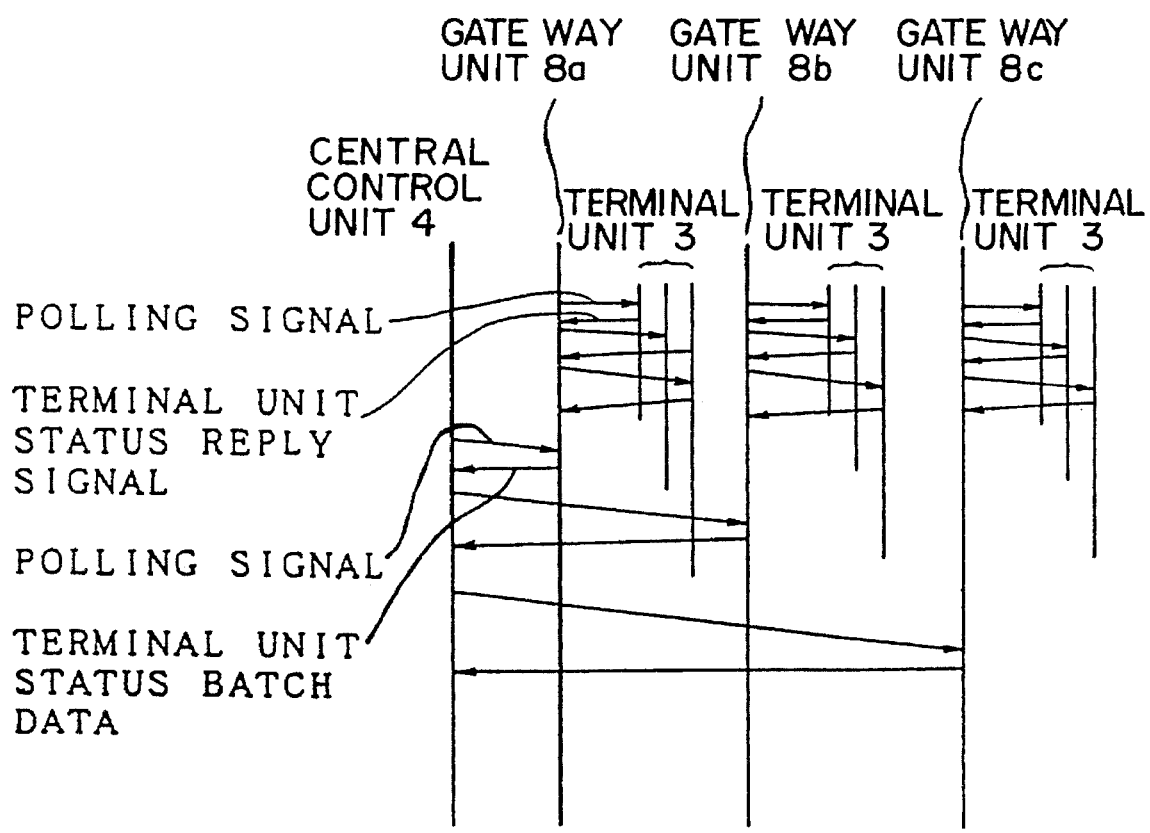

LOAD CONTROL SYSTEM

This application is a divisional, of application Ser. No. 07/944,315, filed Sep. 14, 1992, now U.S. Pat. No. 5,455,761 which is a continuation of application Ser. No. 07/405,140, filed Sep. 11, 1989, now U.S. Pat. No. 5,175,677.

BACKGROUND OF THE INVENTION

1. Field of the Invention

The present invention relates to a load control system and, more particularly, to a system for providing centralized monitoring and/or control for a plurality of loads such as luminaire loads (lighting fittings) and the like.

2. Description of the Prior Art

The disclosure of Japanese Laid-open Patent No. 7,587/1981 is hereby incorporated as the prior art by reference. FIG. 1 shows the schematic diagram of the prior art load control system illustrated in said literature, wherein, 1 denotes a power line, 2 denotes a plurality of luminaire loads connected thereto, 3 denotes a plurality of terminal units for providing ON-OFF control of the plurality of luminaire loads 2 with the use of switching devices such as relay contacts and the like, and 4 denotes a central control unit to send out control signals to terminal units 3 for the control of luminaire loads 2 via a signal transmission line 5 whereby a specific address is assigned respectively to each terminal unit 3.

According to the prior art system, a load control signal transmitted first from the central control unit 4. This load control signal is consists of a base band or a modulated pulse train, more specifically, of a series of address pulses having an address data for specifying a required terminal unit 3 and a series of control pulses having a control data for controlling the respective luminaire load 2 which is connected to the selected terminal unit 3. Each terminal unit 3 monitors a load control signal which is transmitted through the signal transmission line 5 and accepts the load control signal if the address data thereof coincides with own address. The terminal unit 3 then decodes the control data contained in the accepted signal and provides the required control of the luminaire load 2 in accordance with the decoded control data through the use of relay contacts and the like. Further, there is provided a monitor input terminal (not shown) with each of the terminal units 3, and a signal indicating the status of each luminaire load 2 which is connected to the respective terminal unit 3 is fed to this monitor input terminal. The signal indicating the status of the luminaire load 2 is transmitted to the central control unit 4 as monitor input pulses together with address pulses indicating the address of the terminal unit 3 and address pulses indicating the address of the central control unit 4. The status of each luminaire load 2 is monitored at the central control unit 4 by receiving the monitor input pulses.

FIG. 2 is a diagram illustrating the luminaire load control system of the prior art being installed in a building facility together with an electric power unit. Branch power lines 1a–1d of the main power line 1 are branched through 20 A rating breakers 6a–6d. According to the law or private regulations such as an electric installation engineering standard, the capacity at the final end of the power line is specified to 20 A when the luminaire loads are fluorescent lamps. Connected to each branch power line through a terminal unit are luminaire loads. For instance, luminaire loads 2a–2c are connected to a branch power line 1a through a terminal unit 3a. Generally, in an ordinary building facility, a plurality of breakers 6a–6d are installed in an electric power room as one unit of a distribution board for centralized control. That is, the branch power lines 1a–1d are branched from the electric power room by every 20 A electric current capacity in a star connection. On the other hand, every terminal unit 3a–3p is installed in the ceiling in proximity to its respective luminaire load in order to shorten the wiring thereto and a signal transmission line 5 is connected to the terminal units 3a–3p in a transition connection whereby the terminal units are connected in series. As is described above, according to the prior art system, the breakers 6a–6d and the central control unit 4 are gathered for centralized monitor and control.

The disclosure of Japanese Laid-open Patent No. 64,140/1988 is hereby incorporated by reference in FIG. 3 as another prior art load control system. Now referring to FIG. 3, branch power lines 1a–1d are branched from the main power line 1. Connected to the respective branch power lines are a plurality of luminaire loads 2a1–2d2, a plurality of control terminals 3a1–3d2 which are connected to respective luminaire loads for providing ON - OFF control thereof by utilizing switching means such as relay contacts and the like, a plurality of control means made up of operation command input terminals 4a1–4d2 for operating the control terminals, central control units 4A–4B for sending out control signals to said control terminals 3a1–3d2 upon receipt of signals from said operation command input terminals 4a1–4d2 corresponding to the branch power lines 1a–1d, and block filters 7 for providing the isolation of a signal for power line carrier communication between the main power line 1 and the branch power lines 1a–1d.

According to this type of load control system, in case of controlling a luminaire load 2 being connected to a different branch power line, for instance, in case of controlling the luminaire load 2a1 being connected to the branch power line 1a from the operation command input terminal 4d1 connected to the branch power line 1d, the flow of the control is as follows. First, an operation command is transmitted from the operation command input terminal 4d1 to the central control unit 4B through the branch power line 1d in power line carrier communication mode. Second, the central control unit 4B then transmits the information in the power line carrier communication mode to the central control unit 4A being connected to the branch power line 1a, which is connected to the control terminal 3a1 to be controlled, via the main power line 1 in accordance with the contents of the received command. Thirdly, the central control unit 4A which has received the information sends out the operation command through the branch power line 1a to the control terminal 3a1. Finally the luminaire load 2a1 is controlled by the control terminal 3a1 under the received operation command with use of switching means such as relay contacts.

As mentioned above, numerous prior art systems for controlling luminaire loads have been proposed and these systems essentially utilize two line systems in wiring, a power line system and a signal transmission line system, which has resulted in expensive installation and required wire checking for each line system in case of failure. In order to check every terminal unit when the signal transmission line system is out of order, for example, the checking has to be done by turning off the power to the power line system for the loads which are under the control of the terminal units to which the signal transmission lines are wired. Particularly, in the case of a single signal transmission line being wired to a plurality of terminal units which are in connection with a plurality of power lines, all of the power lines have to be powered off during the checking period of time. As is clear from the above, there have been many problems in the maintenance of the prior art system, such as in its complexity and the difficulty of checking failures.

It is therefore an object of this invention to solve such problems and to provide a load control system with less wiring and which is easy to maintain.

It is another object of this invention to provide a load control system wherein the maximum time required for a central control unit to detect a failure of a terminal unit is shortened and an amount of traffic through signal transmission lines is considerably decreased.

It is still another object of this invention to provide a load control system wherein an amount of traffic through power lines is decreased by making the reciprocity control possible between terminal units connected on a different branch power lines for hastening the control of loads and improving the reliability.

SUMMARY OF THE INVENTION

In accordance with this invention, an improved luminaire load control system is provided for effectively handling control signals without significantly interfering with the power line installation.

The luminaire load control system comprises a plurality of terminal units for controlling a plurality of loads to be connected to each branch power line branched form a main power line, and a plurality of gate way units for transmitting load control signals, which are transmitted from a central control unit through a signal transmission line, to the terminal units by converting them into power line carrier communication signals.

According to the specific embodiment of the invention, each gate way unit in the above mentioned luminaire load control system further includes a means to confirm the connecting status of each terminal unit to be connected to the respective branch power line, a means to store the information of connecting status of each terminal unit, and a means to transmit the stored information to the central control unit in a lump.

According to the another specific embodiment of the invention, in the luminaire load control system recited above, further included are a plurality of control means, one for each branch power line, for controlling a plurality of luminaire loads in respective branch power line, and a means for providing the reciprocity control between terminal units connected in different branch power lines by mutually connecting a plurality of gate way units in the branch power lines by using exclusive communication lines and by converting a transmission signal for power line carrier communication through the branch power lines into a transmission signal accommodated to the exclusive communication lines wired for the gate way units.

It is an advantage of the present invention that, since the load control signal transmitted from the central control unit is sent to the respective branch power line after converting it into a power line carrier communication signal at the gate way unit in the respective branch power line and the loads connected to the branch power line are controlled in accordance with the received load control signal by the respective control unit in connection therewith, the power line system and the signal transmission system between the gate way units and the respective loads can be used commonly for providing the least amount of wiring. Moreover, the maintenance relating to the wiring system can easily be carried out because, in this arrangement, there is one to one correspondence between the branch power line and the signal transmission line with respect to the transmission of the control signal to the luminaire loads connected thereto.

In accordance with a specific embodiment of the invention, since the connecting status of each terminal unit in connection witch a branch power line is confirmed and stored by a respective gate way unit provided for the branch power line and the stored information of each connection is transmitted to the central control unit in a lump from the gate way unit, there is no need of polling for each terminal unit in a separated manner from the central control unit. Therefore the act of polling is distributed and the time required to make a round of all of the terminal units in the polling is decreased, thus resulting in the considerable shortening in the maximum time required by the central control unit for detecting a failure in a terminal unit. Further, with this arrangement, the information regarding the wiring connection of each terminal unit can be transmitted to the central control unit in a lump from the respective gate way unit, therefore amounts of traffic through the signal transmission line is also decreased significantly According to the another specific embodiment of the invention, in order to control a luminaire load from the operation command input terminal unit connected in a different branch power line, an operation command is transmitted in power line carrier communication mode to the gate way unit through the branch power line to which the operated operation command input terminal is connected. The gate way unit then converts the received the power line carrier communication signal into an exclusive communication signal and transmits this converted signal to another gate way unit connected to the branch power line to which the control terminal to be controlled is connected through the exclusive communication line. The gate way unit that has received the converted signal then transmits the operation command to the control terminal unit through the branch power line. The control terminal unit that received the operation command operates switch means in turn for controlling the luminaire load in accordance therewith. In this way, this specific embodiment of the invention can use exclusive communication lines between gate way units different from the prior art system, so that the signal transmission between the branch power lines is greatly improved and provided in high speed.

BRIEF DESCRIPTION OF THE DRAWINGS

FIG. 4 is a block diagram showing an embodiment of this invention;

FIG. 6 is a block diagram showing an embodiment of this invention installed in a power line installation;

FIG. 7 is a signal structure of polling signal to be transmitted from a central control unit shown as an illustrative purpose;

FIG. 11 is a sequence diagram showing a power line carrier communication when the polling signal of FIG. 9 is used in the arrangement of FIG. 10.

DESCRIPTION OF THE PREFERRED EMBODIMENTS

Figure 1:
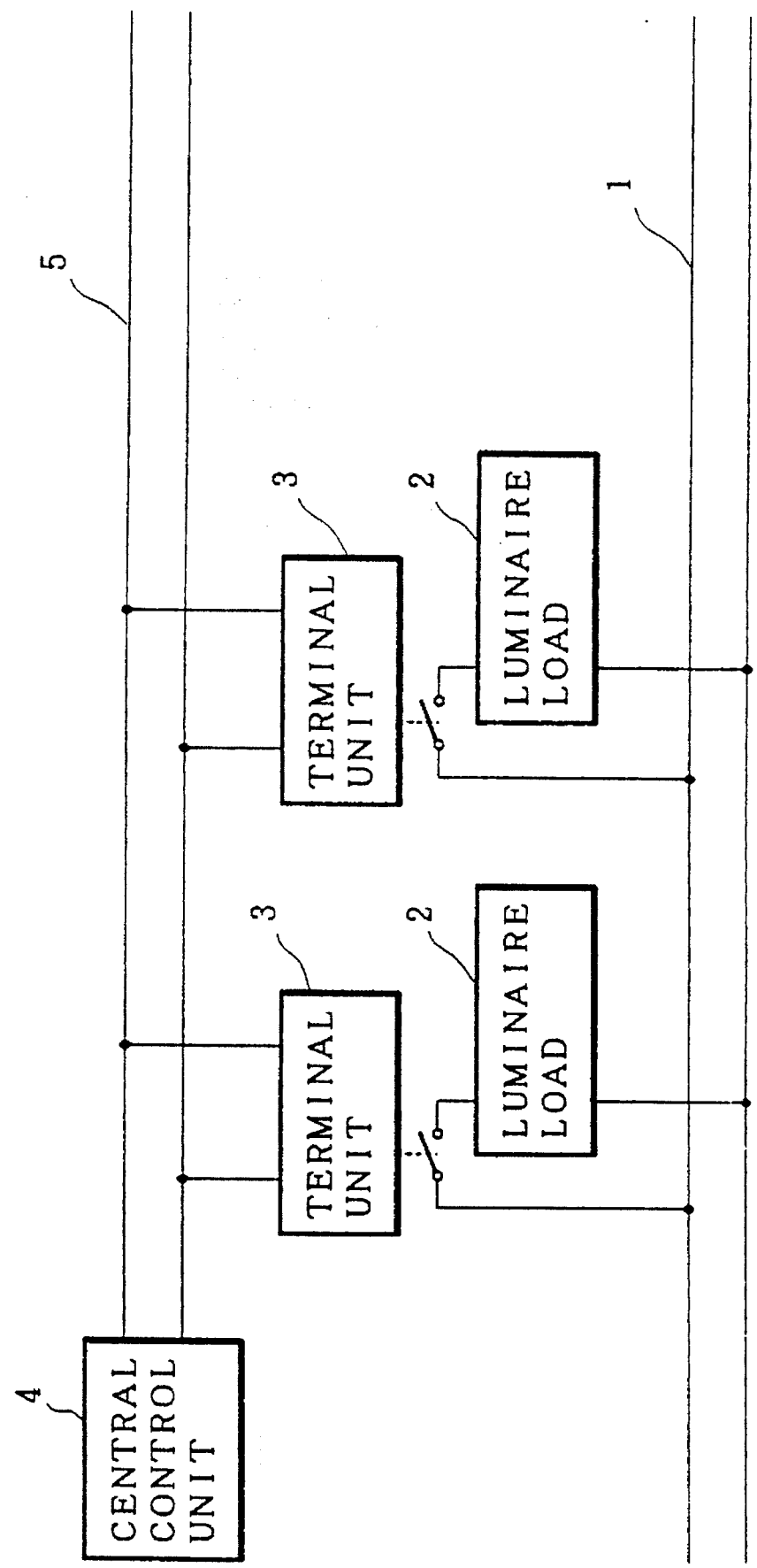
FIG. 1 is a block diagram showing a prior art load control system.

The present invention will now be described more in detail with reference to the accompanying drawings. Referring now to FIG. 4, there is shown a block diagram of the present invention, the numerals 2–5 identify like elements in the prior art system shown in FIG. 1, wherein 8a and 8b denote gate way units of each branch power line 1a, 1b for sending out load control signals transmitted from the central control unit 4 to the respective branch power line 1a, 1b after converting them into power line carrier communication signals. Each terminal unit 3 is connected to the respective branched power line 1a, 1b and the each gate way unit 8a, 8b is assigned an address code respectively in the same manner as terminal units 3.

Figure 5A:
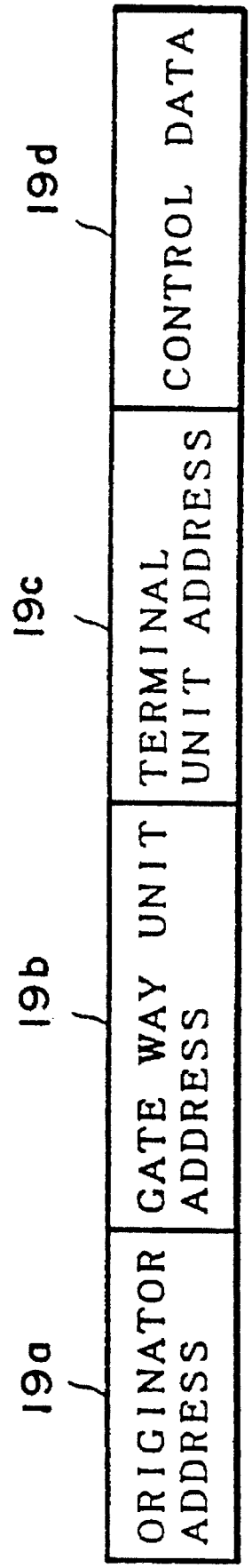
FIG. 5A and 5B together form a signal structure of load control signal in accordance with this invention.
Figure 5B:
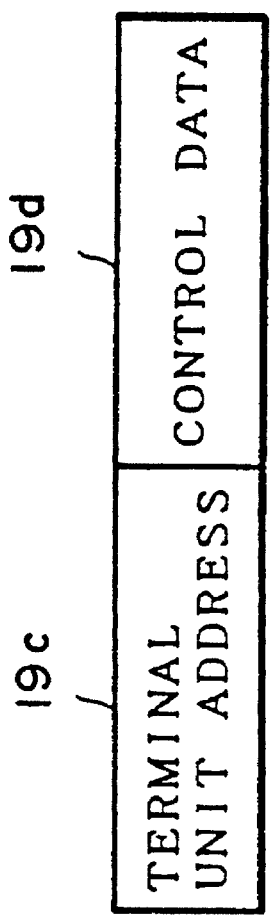

In the operation of the load control system shown in FIG. 4, a load control signal is transmitted from the central control unit 4 to the signal transmission line 5. As is shown in FIG. 5A, the load control signal consists of an originator address code pulse 19a to identify the originator, a gate way address code pulse 19b to identify the gate way unit that corresponds to the branch power line to which the luminaire load 2 for the control is connected, a terminal unit address code pulse 19c to identify the address data of the terminal unit 3 which controls the luminaire load 2, and control data 19d to specify the control for the luminaire load 2. Each gate way unit 8a, 8b watches for a signal to be directly transmitted through the signal transmission line 5 without intermission and will accept the signal if the gate way address is indicating its own address. Upon receipt of the address signal, the gate way unit converts the terminal address code pulse 19c and the control data 19d into a transmission signal accommodated to the power line carrier communication, modulates a power line carrier wave, and then sends its out to the branch power line 1a as is shown in FIG. 5B. In like way, each terminal unit watches for a signal to be transmitted through the branch power line 1a and will accept the signal if the terminal address code pulse 19c is indicating its own address and then controls the respective luminaire load 2 in accordance with the contents of the control data 19d. The status of the luminaire load 2 is fed to the terminal unit 3 as a monitor input signal and sent out to the branch power line 1a as a monitor input pulse together with an address code pulse indicating the gate way 8a. The gate way 8a then accepts the transmitted signal having the address code pulse being addressed thereto on the branch power line 1a, converts it into a transmission signal for the signal transmission line 5 and sends it out to the signal transmission line after adding an address code pulse indicating the address of central control unit 4. The status of the control of the luminaire load 2 is then monitored at the central control unit 4 by receiving the input monitor pulse.

As it has been described above, by providing the gate way unit respectively to each branch power line, it is possible to utilize the branch power lines 1a, 1b as control signal transmission lines between the gate ways 8a, 8b and the respective terminal units 3 in common and less wiring is used in installation.

Figure 2:
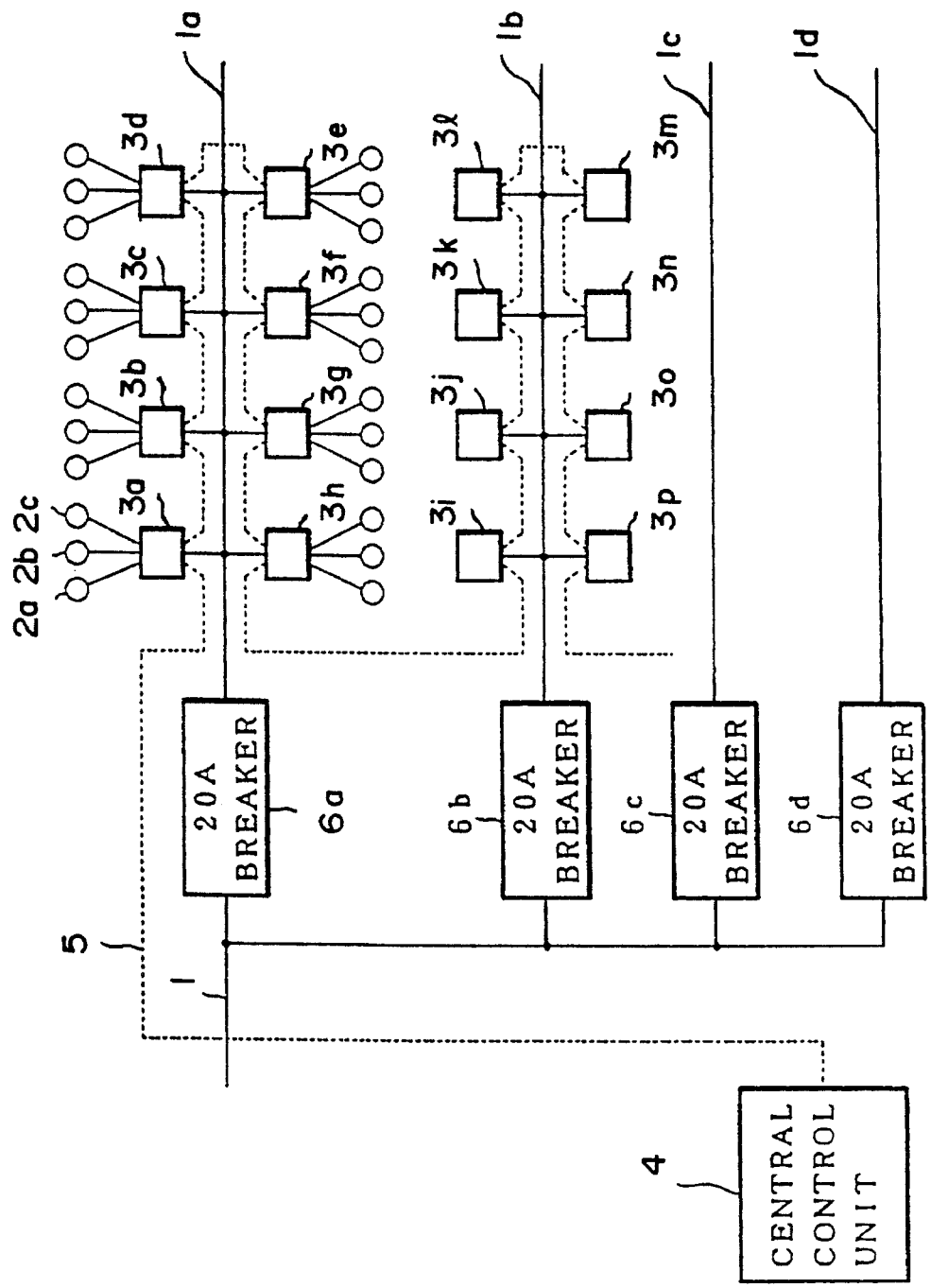
FIG. 2 is a block diagram showing the prior art load control system together with a power line installation.
Figure 3:
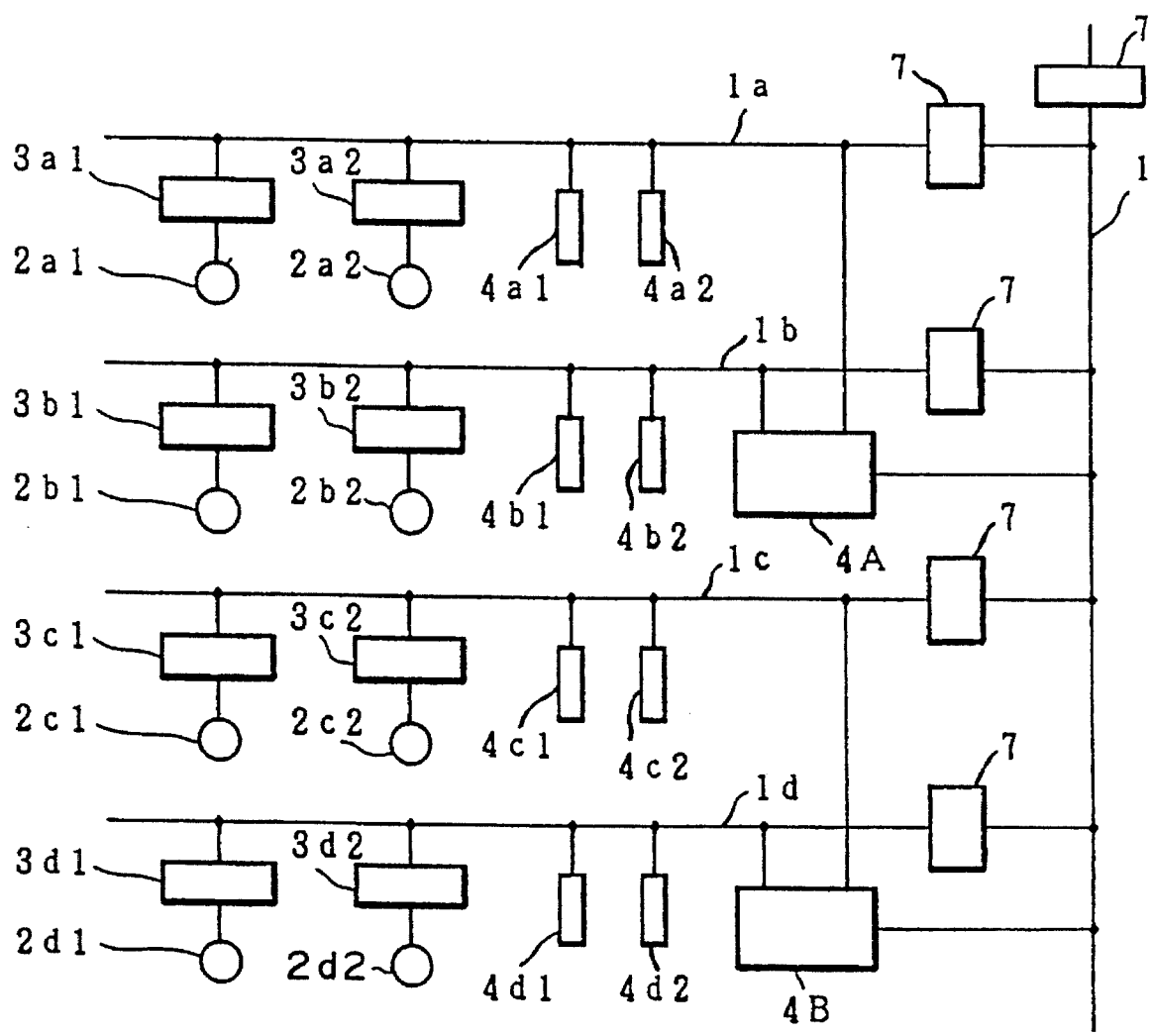
FIG. 3 is a block diagram showing another prior art load control system.

In FIG. 6, there is shown a block diagram illustrating an another embodiment of this invention for a luminaire load control system in a building installation together with a power line installation. The numerals 1, 1a–1d, 2a–2c, 3a–3h, 4, 5, and 6a–6d denote like elements in the prior art system shown in FIG. 2. The numerals 8a–8d denote gate way units provided at each branch power lines 1a–1d. The numerals 7a–7d denote block filters for protecting a carrier wave signal for power line carrier communication to be used in each branch power line 1a–1d from leaking to different branch power lines and for making an impedance of each branch power line 1a–1d with a capacity of 20 A high against the carrier wave signal. In such an arrangement for the luminaire load control system, the branch power lines 1a–1d are also used as the signal transmission lines for transmitting a control signal to respective terminal control units and the luminaire load control is performed in the same way as is described in the previous embodiment under the least amount of wiring in the installation. Further, as the gate way unit is provided for each branch power line 1a–1d, the signal transmission line system and the branch power line system beyond the gate way units correspond each other in a one to one relationship. Therefore in case of a failure of the luminaire system the checking can be performed separately for every branch power line and there will be no influence on branch power lines other than the branch power line under maintenance as well.

Generally, the power line carrier communication is considered as a low reliable communication system because of the uncertainty of the power line characteristics as a signal transmission line. However, in the embodiments of this invention, the current capacity of branch power lines to be used for the power line carrier communication system is limited to 20 A for each and limited numbers of luminaire are connected. Therefore, loads it is possible to maintain the characteristic of the branch power line as a signal transmission line and a high reliable power line carrier communication line is provided with appropriate circuit designing.

Further, in the power line carrier communication system, in order to achieve the reliability of the signal transmission, the transmission speed of the signal has been kept slow. Therefore, if the terminal units to be connected to the power line which is involved in the power line carrier communication are increased in number, the communication traffic will be increased in turn on the power line and results in the spoiling of the response in the load control. However, since in the embodiments of the invention, a unit of the power line carrier communication system is limited within the scope of the extent defined by the law or regulation such as electric installation engineering standard and the like and also the numbers of luminaire loads and the terminal units to be connected to the power line system are limited as it has been described above, there is provided a practical enough control response system even in such a low signal transmission speed condition.

By utilizing 20 A breakers being capable of ON-OFF switching by remote control such as remote control breakers for the breakers 6a–6d shown in the embodiment of FIG. 6 and by arranging the remote control breaker controllable from the respective gate way units 8a–8d based upon the control signals from the central control unit 4, there is provided is an easy maintenance load control system. For example, a controlled status of the luminaire load 2 when the terminal unit 3 is at offset or a controlled status of the luminaire load 2 when no control signal is fed is assigned as a turn ON status. With this assignment, the controllability of the load control system can be maintained even under such conditions as when the power line carrier communication system in a branch power line is interrupted due to the failure of the terminal unit or other reasons, by providing the ON - OFF control with a remote control breaker under the control of gate way units 8a–8d to which a control signal is fed from the central control unit 4 for simultaneously controlling whole luminaire loads connected to the branch power line in trouble.

The status of connection to each terminal unit 3 in the load control system as described above, may be confirmed by sending out a polling signal from the central control unit 4 to the signal transmission line 5 for the confirmation of the connecting status of the terminal units. The polling signal as exemplified by FIG. 7 may consist of an originator address 17a indicating the address data for the originator, a gate way address 17b indicating the address data for the gate way units 8a–8b that correspond to the branched power lines 1a and 1b to which the terminal units 3 for which status is being confirmed are connected, a terminal unit address 17c indicating the address data for the respective terminal unit 3 to be confirmed, and a control data 17d for the terminal unit 3 (loop back request command herein).

In order to make polling with such a polling signal as described above, the polling signal is sent out from the central control unit 4 to each terminal unit 3 respectively through the signal transmission line 5. This signal is then converted into a transmission signal for the power line carrier communication by the respective gate way unit 8a, 8b, and the converted transmission signal is received at each terminal unit 3. Each terminal unit 3 then transmits a reply signal to the respective branch power line 1a, 1b, and sends back the reply signal to the central control unit 4 through the respective gate way unit 8a, 8b.

Figure 8:
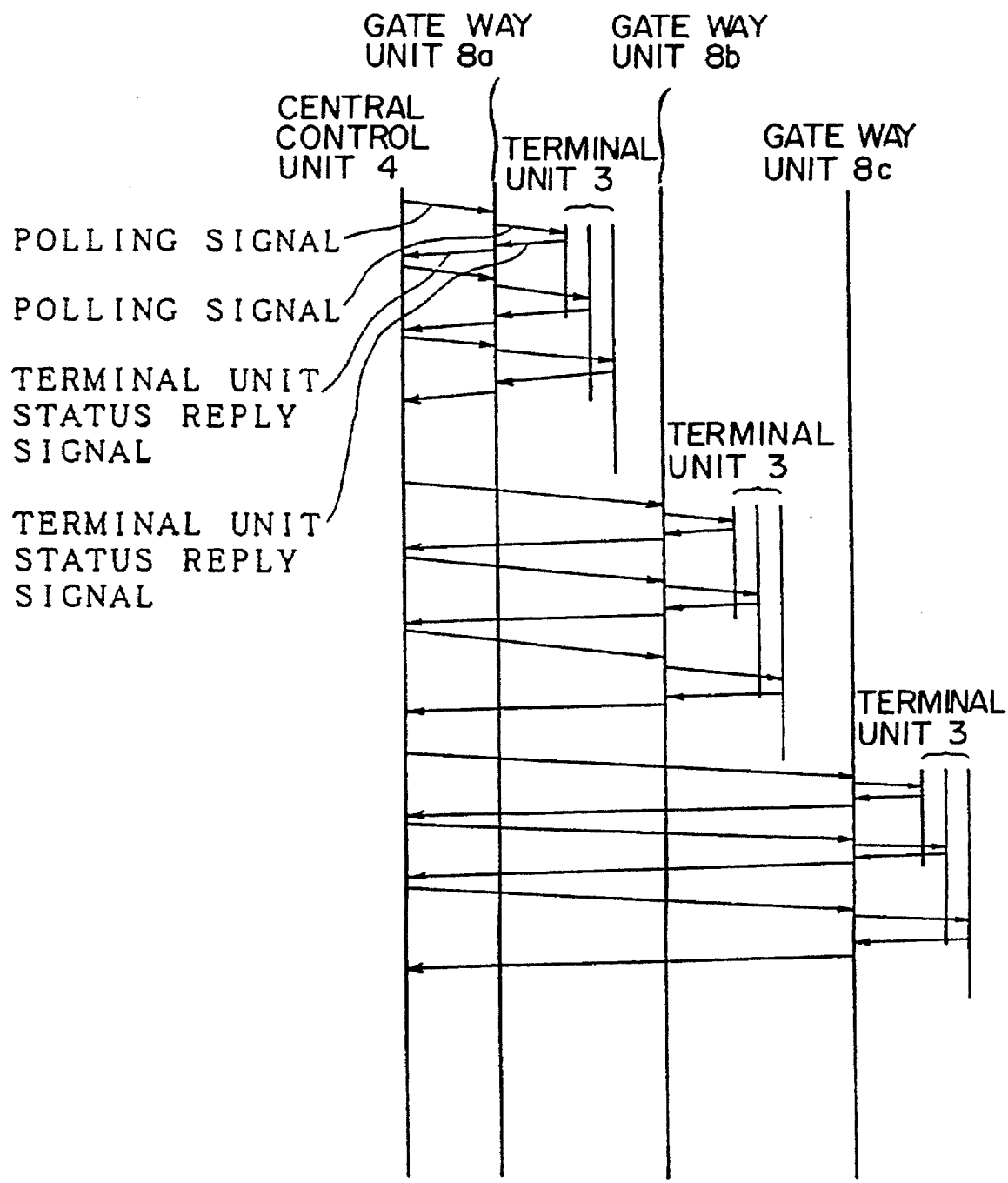
FIG. 8 is a sequence diagram showing a power line carrier communication when the polling signal of FIG. 7 is used in the arrangement of FIG. 4.

FIG. 8 illustrates the sequence diagram of the operations stated above, wherein three gate way units 8a–8c are utilized. As mentioned above, since the signal transmission speed is kept low for attaining the reliability of the control, it takes a long time to get through the polling against the whole terminal units if a considerable amount of terminal units 3 are connected to the branch power lines and there is a possibility of taking too much time before detecting a failure of the terminal unit 3 at the central control unit 4 and also there is a problem of increasing an amount of traffic in the signal transmission line 5.

According to the next embodiment of this invention, this problem is solved by the provision that an amount of traffic in the signal transmission line is decreased considerably by giving a specific feature to each gate way unit. In this embodiment, the gate way units 8a, 8b each connected to the respective branch power line 1a, 1b and capable of sending out a control signal transmitted by the central control unit 4 to the respective luminaire load 2 through the signal transmission line 5 after converting it into a transmission signal for the power line carrier communication includes the following polling functions. They are additionally equipped with a function for confirming the connecting status of each terminal unit 3 connected to the respective branch power line 1a, 1b, and a function for storing information regarding the connecting status of each terminal unit 3 and for sending the stored information to the central control unit 4 in a lump.

Figure 9A:
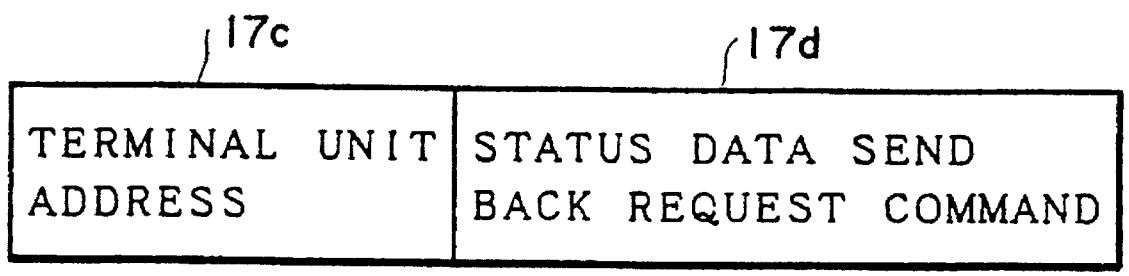
FIG. 9A and 9B together form a signal structure of polling signal to be transmitted from the central control unit in an another embodiment of this invention.

In accordance with the load control system as equipped with the functions as above, the polling for each terminal unit 3 can be done in the following step. The polling signal (control signal for luminaire loads 2) is sent out from the gate way unit 8a, 8b respectively to the branch power line 1a, 1b, wherein the polling signal consists of a terminal unit address 17a and a control data 17d (herein a status data send back request command) as is shown in FIG. 9a. Each terminal unit 3 watches for the polling signal being sent out through the branch power line 1a, 1b and accepts the polling signal if the terminal address 17c coincides with its own address to perform the required process (herein the process for sending back the status of the terminal unit 3 to the respective gate way unit 8a, 8b) based upon the contents of the control data 17d.

At the terminal unit 3 that received the polling signal, the terminal address 17c and the control data 17d are replaced respectively with a gate way address 8a, 8b and a data representing the status of the terminal unit 3 for sending back through the branch power line 1a, 1b. In this case, the gate way units 8a, 8b also watch for transmitted signals over the branch power lines 1a, 1b and are enabled to accept the data representing the status of the connection transmitted from the terminal unit 3 to which the request command is addressed.

Figure 9B:
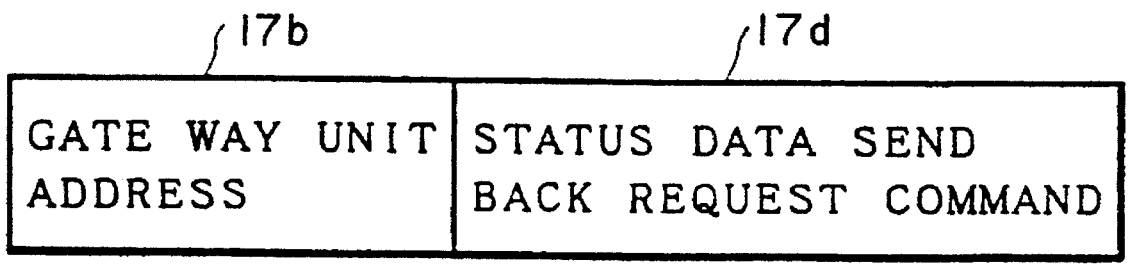

Further, a polling signal consists of a gate way unit address 17b and a control data 17d shown in FIG. 9b which may be substituted for the structure of the polling signal in the above.

Figure 10:
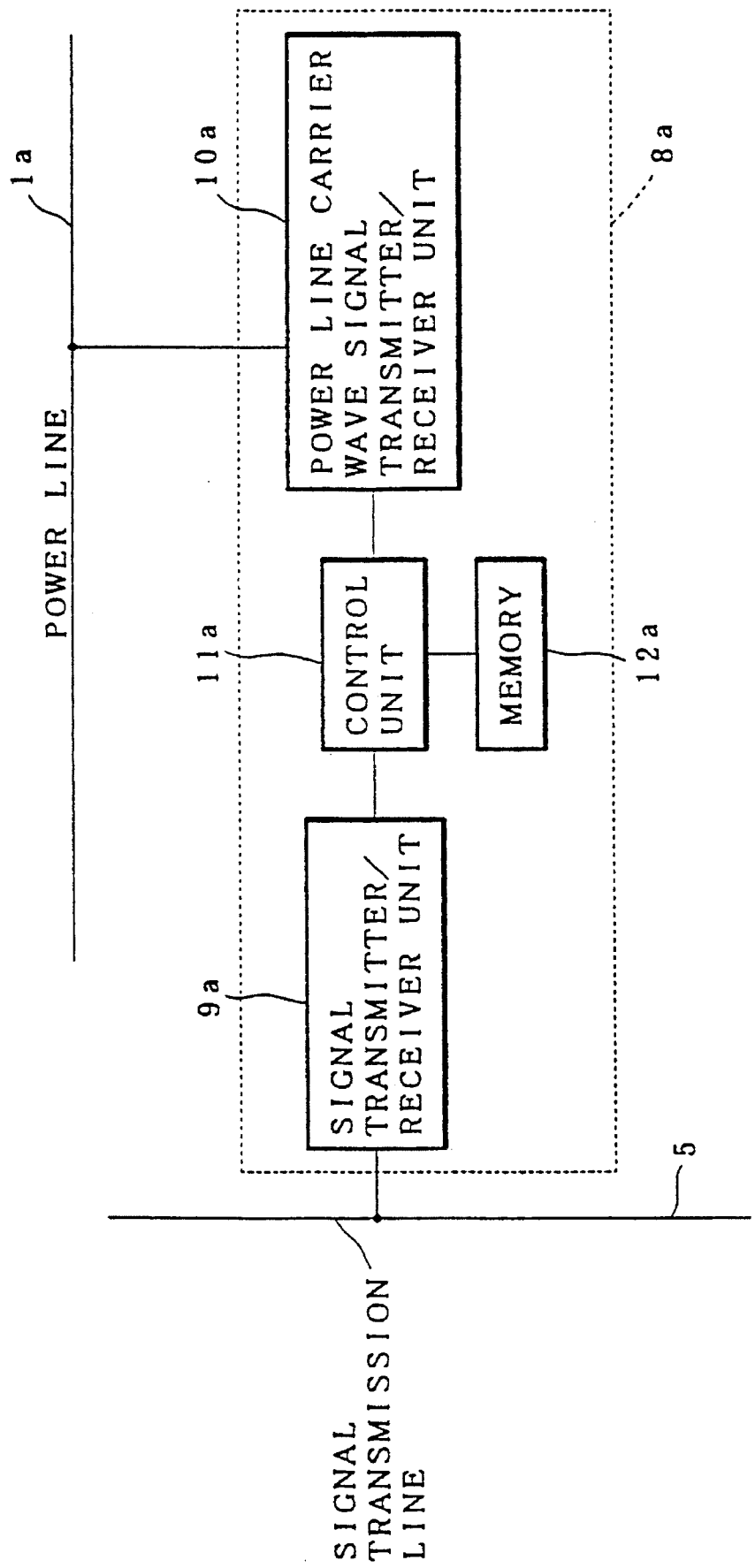
FIG. 10 is a fragmentary detailed block diagram showing a gate way unit to be used with the polling signal shown in FIG. 9.

Referring now to the FIG. 10, a presently preferred structure of the gate way unit in accordance with this invention is shown as a block diagram. One gate way unit 8a is shown however, the others have the same structure. Block 9a is a signal transmitter receiver unit for exchanging a signal between the gate way unit 8a and the central control unit 4 through the signal transmission line 5, block 10a is a power line carrier communication signal transmitter receiver unit for carrying out the power line carrier communication with the terminal units 3 through the branch power line 1a, block 11a is a control unit for performing the control of the related units, and block 12a is a memory unit to store information such as the status of terminal units 3.

Since the above illustrated gate way unit 8a can store the status of each terminal unit 3 connected to the branched power line 1a in the memory unit 12a, it is possible to send back the stored status information of the terminal units 3 to the central control unit 4 in a lump when the control signal to request the polling of the terminal units 3 is transmitted from the central control unit 4. This eliminates the polling for the terminal units 3 to carry out one by one from the central control unit 4 and then distributing the steps of the polling as well as decreasing the time required to make a round of polling of the terminal units 3. Therefore, the maximum time required to detect an irregularity in the terminal units 3 by the central control unit 4 is considerably decreased in this preferred embodiment of the invention.

Moreover, in accordance with this preferred embodiment of the invention, amount of traffic on the signal transmission line 5 is greatly decreased.

A sequence diagram for polling according to the preferred embodiment illustrated in FIG. 10 is shown in FIG. 11. As seen, the amount of traffic between the central control unit 4 and each gate way unit 8a–8c is distinctly decreased from that of FIG. 8 and this then decreases the time required after the polling signal has been transmitted and the send back signals carrying the status information of the terminal units are collected at the central control unit 4 even if the terminal units 3 are increased in number. This is because each gate way unit has added the polling function as has been described in the foregoing.

Figure 12:
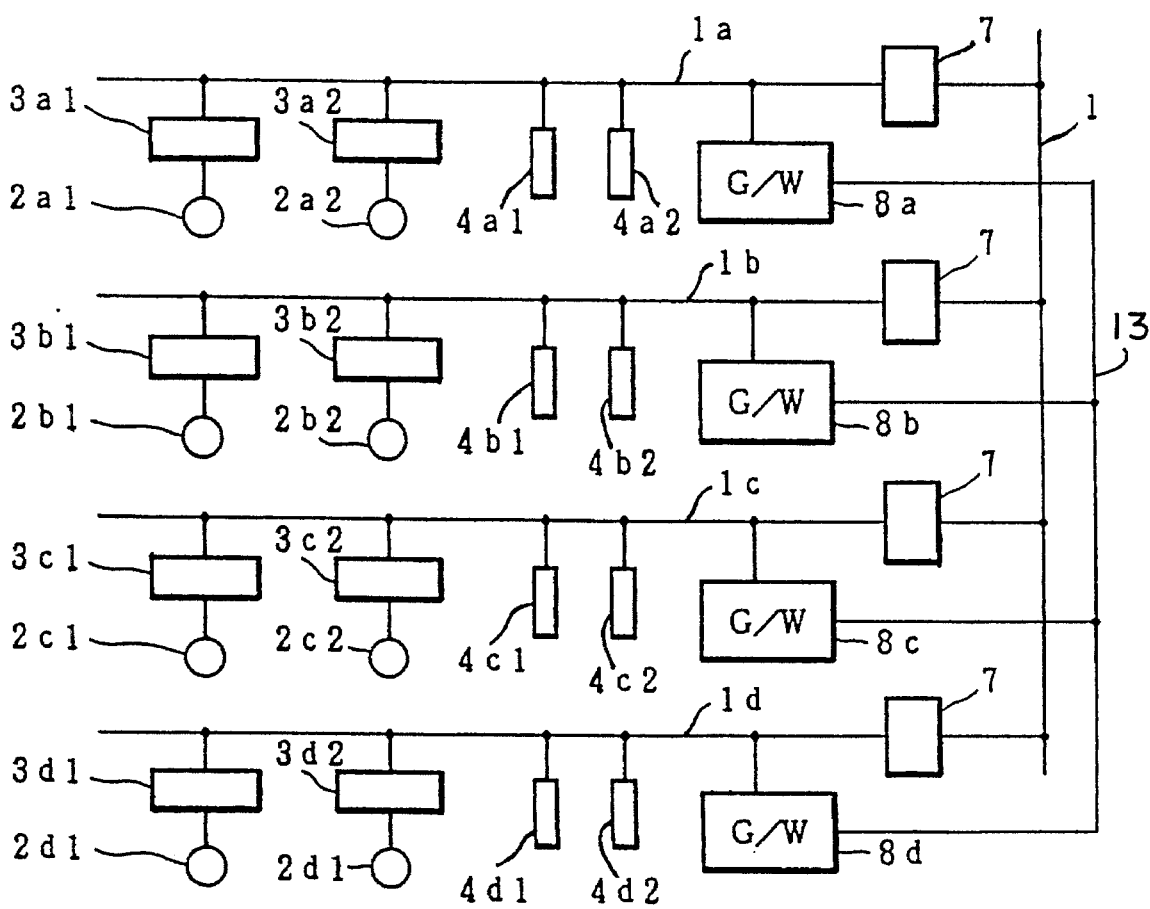
FIG. 12 is a block diagram showing still another embodiment of this invention.

Still another preferred embodiment of the invention is shown in FIG. 12, wherein the blocks 1–5, 7 are the like elements shown in FIG. 8 and blocks 8a–8d are a plurality of gate way units provided for the branch power lines 1a–1d correspondingly. The numeral 13 denotes a specific signal transmission line installed in between the plurality of gate way units 8a–8d.

In this preferred embodiment of the invention, a plurality of control means comprise a plurality of terminal control units 3a1–3d2 for controlling a plurality of respective loads 2a1–2d2 and a plurality of operation command input terminal units 4a1–4d2 for transmitting operation commands to the respective gate way units through the branch power lines 1a–1d. With the help of the gate way units 8a–8d and the specific signal line 13 inter-connecting the gate way units 8a–8d, the power line carrier communication signals on the branch power lines 1a–1d are converted into transmission signals accommodated to the specific communication, and the reciprocity control amongst the components such as the control terminal units 3a1–3d2 connected to the branch power lines 1a–1d, the operation command input terminal units 4a1–4d2 and the like, can be performed.

Further, in this type of load control system, the reciprocity control of the luminaire loads 2 connected to any two of the branch power lines 1a–1d, for example, the control of the luminaire load 2a1 connected to the branch power line 1a from the operation command input terminal unit 4d1 which is connected to the branch power line 1d, can be done in the following steps. An operational information is transmitted to the gate way unit 8d from the operation command input terminal unit 4d1 as a power line carrier communication signal through the branch power line 1d. The gate way unit 8d which received the operational information converts the power line carrier communication signal into a transmission signal for the specific signal line and then the converted operational information is transmitted through the specific signal line 13 to the gate way unit 8a connected to the branch power line 1a to which the control terminal unit 3a1 to be controlled is connected. In the next step, the gate way unit 8a which received the converted operational information sends out the operation command to the control terminal unit 3a1 through the branch power line 1a. Hence, the control terminal unit which received the operational command controls the luminaire load 2a1 in accordance with the command by operating the switching means such as relay contacts and the like.

In this preferred embodiment of the invention, the signal transmission between the branch power lines is carried out by utilizing the specific signal line, so that there provided is a high speed communication and also the time duration from the request of control by the operation terminal unit to the commencement of the control is kept substantially constant regardless of the number of branch power lines as well as the number of requests to carry out. In other words, there is provided a considerable decrease in waiting time.

Further, in an application of this preferred embodiment of the invention to a large scale load control system such as a system to be used in a building installation, since the signal transmission between the branch power lines can be carried out through the specific signal line wired therebetween, there is no need for power line carrier communication signals to be transmitted through the main power line and this results in the elimination of block filters to be installed in the load only branch power lines for blocking off the power line carrier communication signals.

It should be appreciated from the foregoing description that the present invention provides an improved load control system for controlling a plurality of luminaire loads connected to a plurality of branch power lines with use of a plurality of gate way units, each of which can afford to transfer a control signal into a power line carrier communication signal, mounted respectively to each of the branch power line.

In another preferred embodiment of the present invention, each gate way unit further can afford to store the information after confirming the status of connections to the terminal units and to send back the stored information in a lump to the central control unit upon request.

In still another embodiment of the present invention, the plurality of gate way units can afford to perform the reciprocity control by connecting the gate way units mutually with a specific signal line.

The present invention is not to be considered to be limited to the specific embodiments illustrated, except insofar as may be required by the following claims.

What is claimed is:

1. A load control system comprising:

a plurality of branch power lines;

a plurality of loads selectively connectable to respective ones of said branch power lines;

a plurality of terminal control means for controlling the connecting status of the loads in response to load control signals, each terminal control means being connected to a respective one of said loads and to said load's respective branch power line;

a plurality of input terminal means for transmitting operation commands as power line carrier communication signals on said branch power lines, the input terminal means being connected to ones of said branch power lines;

a plurality of gateway means for providing reciprocity control of the plurality of loads, the gateway means being connected to one another and to respective ones of the branch power lines such that one gateway means is connected to each branch power line, wherein the gateway means generate transmission signals and the load control signals in response to said operation commands received as power line carrier communication signals transmitted by ones of said input terminals means, said transmission signals being communicated among the gateway means and the load control signals being communicated to selected ones of the terminal control means wherein a first one of said plurality of gateway means, connected to a first one of said branch power lines, is adapted to transmit said transmission signals responsive to receiving said power line carrier communication signals from a first one of said plurality of input terminal means connected to the first branch power line, to a second one of said plurality of gateway means, connected to a second branch power line, which in turn transmits load control signals to one of said plurality of terminal control means connected to the second branch power line.

2. A load control system as defined in claim 1, further comprising a signal line connected between each of said gateway means for connecting said gateway means to one another, and wherein said signal line transmits said transmission signals between said first one of said plurality of gateway means and said second one of gateway means.

* * * * *